United States Patent [19]
Day, II et al.

[11] Patent Number: 5,968,116
[45] Date of Patent: Oct. 19, 1999

[54] METHOD AND APPARATUS FOR FACILITATING THE MANAGEMENT OF NETWORKED DEVICES

[75] Inventors: Michael D. Day, II, American Fork; Alan B. Butt, Orem; Stephen W. Belisle, Salt Lake City; Richard R. Winterton, Provo, all of Utah

[73] Assignee: Intel Corporation, Santa Clara, Calif.

[21] Appl. No.: 08/916,494

[22] Filed: Aug. 22, 1997

Related U.S. Application Data

[63] Continuation-in-part of application No. 08/624,773, Mar. 29, 1996, abandoned.

[51] Int. Cl.[6] .................................................. G06F 17/00
[52] U.S. Cl. ............................................ 709/202; 709/220
[58] Field of Search ............................... 395/181, 182.21, 395/182.22, 182.08, 183.06, 183.07, 200.32, 200.5, 200.53

[56] References Cited

U.S. PATENT DOCUMENTS

| | | | |
|---|---|---|---|
| 5,005,122 | 4/1991 | Griffin et al. | 395/200.33 |
| 5,307,354 | 4/1994 | Cramer et al. | 395/182.02 |
| 5,359,730 | 10/1994 | Marron | 395/650 |
| 5,390,256 | 2/1995 | Mandell et al. | 381/77 |
| 5,704,031 | 12/1997 | Mikami et al. | 395/182.02 |
| 5,742,762 | 4/1998 | Scholl et al. | 395/200.3 |

OTHER PUBLICATIONS

Bootstrap Protocol (BOOTP), RFC 951. Croft et al, Sep. 1985.
Operating Systems Design and Implementation, Prentice Hall, p. 68, 1987.
RPC: Remote Procedure Call Protocol Specification Version 2, RFC 1050, Sun Microsystems, Jun. 1988.
Oxford Dictiornary of Computing, Fourth Edition, p. 446–447, 1996.
NetPC System Design Guidelines, Compaq Computer Corporation, Dell Computer Corporation, Hewlett Packard Company, Intel Corporation, Microsoft Corporation, p. 11, Mar. 10, 1997.

*Primary Examiner*—Ellis B. Ramirez
*Attorney, Agent, or Firm*—Blakely, Sokoloff, Taylor & Zafman

[57] ABSTRACT

A network management service for facilitating the management of networked devices by network management applications (a.k.a., agents) is described. In a first embodiment, the network management service for facilitating the management of networked devices by network management applications (a.k.a., agents) comprises an agent discovery service for discovering and registering remote management agents, and a file transfer service operative to send information to and receive information from remote systems.

36 Claims, 10 Drawing Sheets

METHOD AND APPARATUS FOR FACILITATING THE MANAGEMENT OF NETWORKED DEVICES

The present application is a continuation-in-part of application Ser. No. 08/624,773 filed on Mar. 29, 1996 (now abandoned.) entitled Method and Apparatus for Discovering Server Applications in a Network of Computer Systems by Allan B. Butt and Michael D. Day II, and commonly assigned to the assignee of the present invention.

BACKGROUND OF THE INVENTION

1. Field of the Invention

The present invention relates to the field of networked systems and, in particular, to a method and apparatus for facilitating the management of networked devices.

2. Background Information

Networking of computing elements and, in particular, the implementation of client/server networks, wherein the client is the initiating node and the server is the responding node (i.e., not necessarily referring to a file "server" or an application "server"), are known. Examples of these networks include local area networks (LANS), wide area networks (WANS), global networks (Internet), and the networking of telecommunications devices (i.e., cellular networks, PCS networks, wireline telephony networks), and the like. Many of these networks comprise a variety of client computers having different processor architectures and Operating Systems (OS) using Transmission Control Protocol/Internet Protocol (TCP/IP), Internetwork Packet exchange (IPX), and User Datagram Protocol/Internet Protocol (UDP/IP), or other suitable networking protocols (cumulatively referred to as the Internet communication suite) to produce a seemingly transparent network. Although it may appear to an end-user that the network is seemingly indifferent to computer type (e.g., Intel®-based PC, a Macintosh, or a UNIX system), the useable interface to the network protocols providing the communication interface between the heterogeneous computer systems still rely on the host OS. Therefore, for each of the popular OS, a corresponding "flavor" of the Internet communication suite must be developed in order to network a host computer system operating with any of these OS.

Thus, despite this seemingly transparent operation, the reality is that these heterogeneous computer networks can be very cumbersome to manage and, consequently, expensive to maintain. While the standards-based communication protocols of the Internet communication suite (e.g., TCP/IP, UDP/IP, IPX) have facilitated the promulgation of such heterogeneous networks, those who manage these networks must duplicate a number of resources to account for a variety of processor architectures and corresponding OS disposed throughout the network. That is to say that the file management, processor communications and the interface to the network communication suite rely on the OS as the user interface to provide a functional computer system (at least from the perspective of the end-user). Accordingly, in most instances where the OS "hangs" (i.e., seemingly "freezes" in an unrecoverable state), the user is, in essence, locked out from the operational state of the computer and the only recourse is to restart the OS (e.g., by rebooting the computer).

Producers and consumers of computer systems have begun to quantify the costs associated with the purchase and maintenance of computer systems and, to some, the results are surprising. One generalization drawn from such study is that the initial cost of purchasing a computer system and software (regardless of size and complexity) is quite small compared to the cost of maintaining such systems. That is to say, the cost of system management, lost productivity due to computer/network downtime and the like are significantly higher than the initial cost of purchasing the hardware and software elements comprising the network.

It is not surprising then, that consumers of large networks of computing devices are placing more pressure on the computing industry to drive down the cost associated with the management and maintenance associated with computer systems, i.e., to reduce the total cost of ownership (TCO) associated with the purchase and maintenance of the computer systems. Despite their best efforts, however, prior art network management solutions (sometimes referred to as network management tools) to these problems have not had a significant impact on reducing the total cost of ownership.

While the introduction of these tools have improved the general state of network management, fundamental limitations in their effectiveness remain. An example of one such inherent limitation in prior art management tools is the fact that they rely on an operational operating system (OS) at the client computer. That is to say, the prior art network management tools are unable to interface with a "frozen" client computer, much less perform remote diagnostics and maintenance on a client computer in such a state. Rather, many of the prior art management tools created by third party developers merely generate usage statistics, or information readily available from networked computers (or the individual processors of the networked computers), i.e., they merely collect and provide commonly available information via a graphical user interface (GUI).

To further illustrate this limitation with an example, if a user calls a corporate help desk complaining of computer problems, and the network manager determines that the user's OS is "frozen", there is little the network manager can do remotely via the network management software. Consequently, the network manager is often relegated to the rather impotent suggestion of having the user "reboot" the computer and, consequently, losing all of the data stored in volatile memory (i.e., not saved on the hard drive).

Thus a need exists for a method and apparatus for facilitating the management of networked devices, unencumbered by the deficiencies and limitations commonly associated with the prior art.

SUMMARY OF THE INVENTION

In accordance with the teachings of the present invention, a network management service for facilitating the management of networked devices by network management applications (a.k.a., agents) is described. The network management service comprises an agent discovery service for discovering and registering remote management agents, and a file transfer service operative to send information to and receive information from remote systems.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
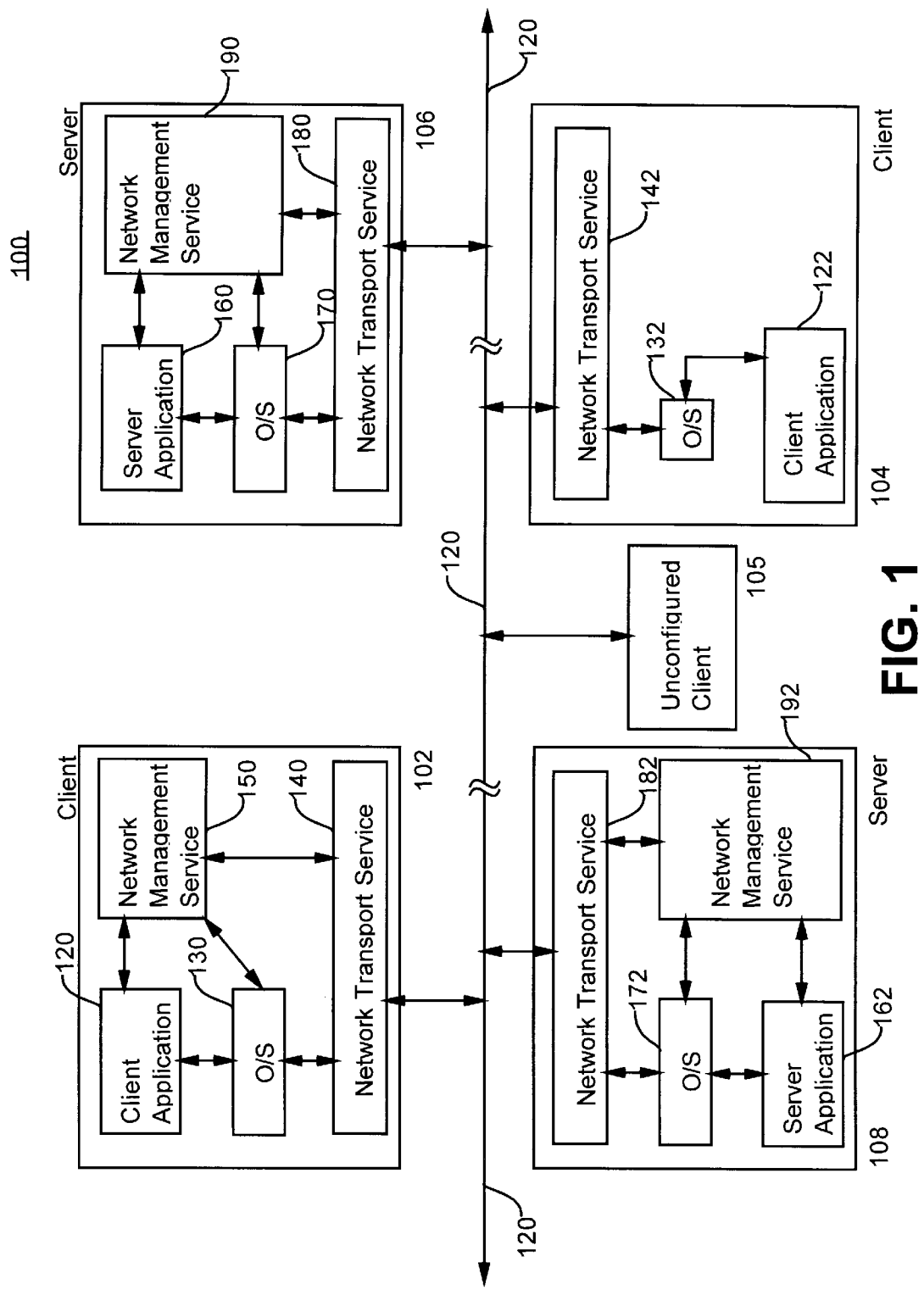
FIG. 1 is a block diagram illustrating an example network of computer systems incorporated with the teachings of the present invention.

Referring now to FIG. 1, a block diagram of an example network of computer systems incorporating the teachings of the present invention is depicted. In one embodiment, for example, network 100 is comprised of a plurality of computing elements, at least a subset of which include the teachings of the present invention. In particular, at least a subset of the computing elements comprising network 100 are disposed with an innovative network management service, incorporated with the teachings of the present invention, enabling an improved level of network manageability and interoperability independent of the myriad of operating systems that may reside within network 100. As will be described more fully below, the network management service incorporating the teachings of the present invention enables a network management application (also commonly referred to as network management agent, or NMA), for example, to interrogate and manipulate a client computer independent of the particular type of operating system (OS) resident on the client computer. In one embodiment, for example, a network management agent may initialize the network management service of the present invention to automatically populate a client computer located within network 100 with a new/updated operating system, and/or replaces an operating system on a client computer within network 100 that has become inoperative.

As depicted in FIG. 1, network 100 is shown comprising clients 102 and 104, and servers 106 and 108, interconnected to each other via network medium 120. In one embodiment, clients 102 and 104 are personal computer systems, while in an alternate embodiment, clients 102 and 104 are telecommunication network devices. As illustrated in FIG. 1, network medium 120 is intended to represent a broad category of networking infrastructure including network cables and their associated switching (routing), repeater, and/or delay elements, suitable for a high speed local area network (LAN), or a slower speed wide area network (WAN), or public network (i.e., Internet) implementations known in the art. Although certain computing elements of network 100 are labeled as servers 106 and 108 while other computing elements are labeled as clients 102 and 104, those skilled in the art will recognize that these labels are for the purpose of illustration and ease of understanding only. The term server includes but is not necessarily limited to a "file" server or an "application" server.

In one embodiment of the present invention, clients 102 and 104 include client application(s) 120 and 122, client operating system (OS) 130 and 132, network transport services 140 and 142 (sometimes referred to as the transport layer), operatively coupled as depicted. In one embodiment of the present invention, client 102 is shown further comprising network management service 150 incorporated with the teachings of the present invention. As will be discussed in greater detail below, a network management service (e.g., network management service 150) may be beneficially incorporated into each of the computing elements of network 100, however, as depicted in FIG. 1, a network management service need not be fully disposed in every client or server in order for network 100 to benefit from the present invention.

Continuing with FIG. 1, as illustrated, client applications 120 and 122 are intended to represent any number of a wide variety of applications, in particular, management applications such as Client Manager and Work Group Manager, available from Intel Corp., of Santa Clara, Calif. As depicted, client applications 120 and 122 rely on operating systems 130 and 132, respectively, to interface with network transport services 140 and 142 and, ultimately, with network medium 120. In one embodiment, as will be discussed in greater detail below, client application 120 may alternatively interface with network medium 120 via network management service 150 and network transport service 140 as shown.

Similarly, operating systems 130 and 132 are intended to represent a wide variety of operating systems common to a corresponding variety of computing platforms. Examples of such operating systems include the UNIX operating system, Windows™ based operating systems (e.g., Windows™ 3.1, Windows™ 95, Windows™ NT and Windows™ CE), the Macintosh™ and NeXTStep™ operating systems, and the like.

Network transport services 140 and 142 perform their conventional function of physically sending and receiving information over the network medium, as known in the art. In one embodiment the form of the information exchange is through a message packet. In one embodiment, for example, the message packet is a datagram, the structure of which will be discussed more fully below in FIG. 3. As illustrated, network transport services 140 and 142 are intended to represent a broad category of transport services known in the art. Examples of such network transport services include Internetwork Packet eXchange (IPX), User Datagram Protocol/Internet Protocol (UDP/IP), NetBEUI, NetBIOS over IP, NetBIOS over IPX, and the like.

In addition to clients 102 and 104, network 100 is also comprised of servers 106 and 108, which include server applications 160 and 162, server operating system 170 and 172, network transport services 180 and 182, and network management services 190 and 192 incorporating the teachings of the present invention, respectively. In an alternate embodiment, to be discussed more fully below, not all of the plurality of servers 106 and 108 need to have its own network management service. So long as a network management service is disposed within the network, the clients/servers of the network may benefit from some measure of the functionality that network management service provides.

As illustrated in FIG. 1, servers 106 and 108 include server applications 160 and 162, operating systems 170 and 172, and network transport services 180 and 182 each of which are intended to represent a broad category of applications, operating systems and network transport services known in the art. Consequently, they will not be discussed further. On the other hand, network management services (e.g., network management services 150, 190 and 192) incorporating the teachings of the present invention, comprise a plurality of services which enable, for example, network management applications to interact with network elements independent of the operating systems resident on those network elements.

Figure 2:
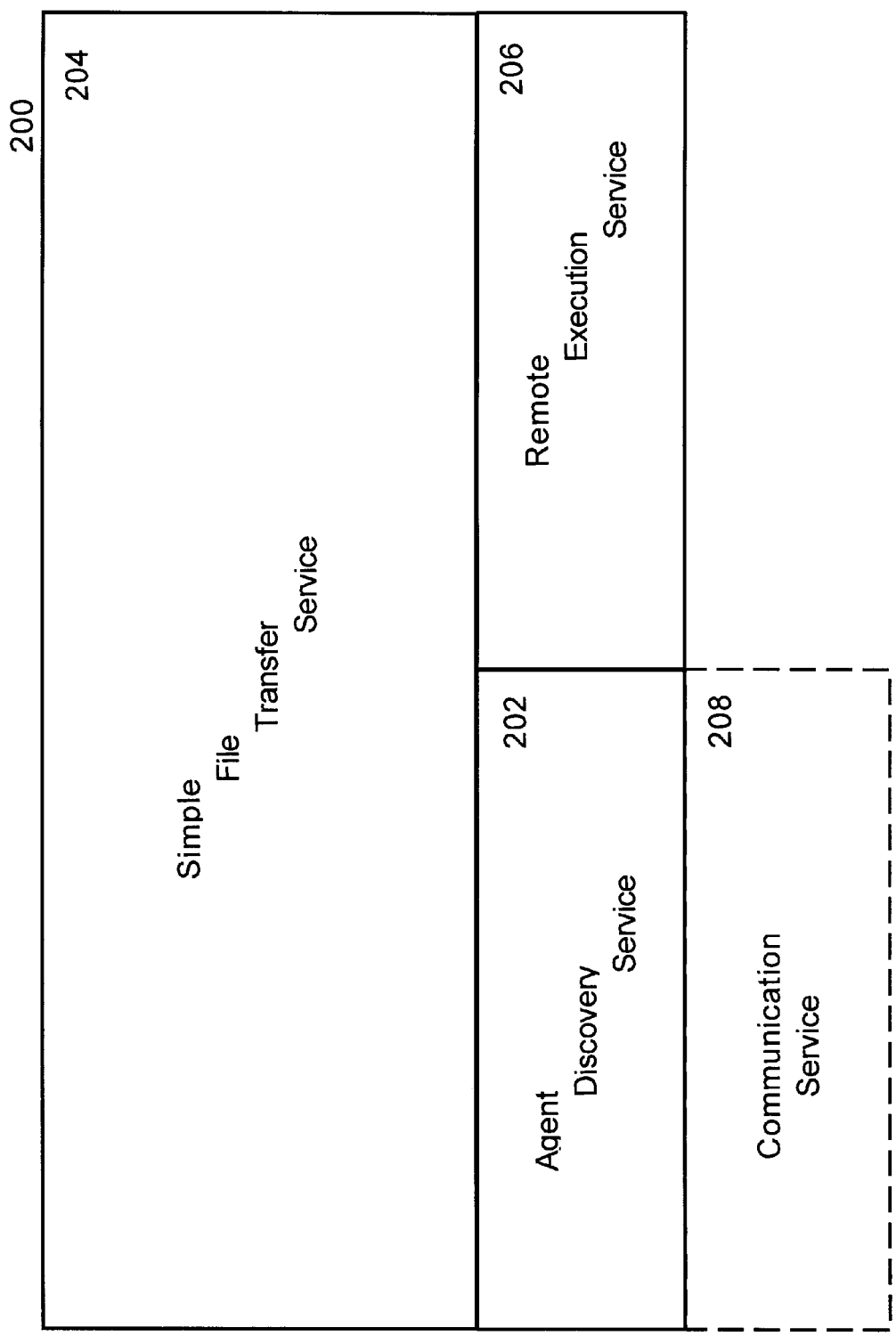
FIG. 2 is a block diagram of a network management service incorporated with the teachings of the present invention.

Turning, then, to FIG. 2, a block diagram depicting one example of a network management service (i.e., network management service 200) is shown. In one embodiment of the present invention, network management service 200 may be beneficially incorporated into network 100 as, for example, network management service 150, 190 and/or 192. In one embodiment, network management service 200 is shown comprising agent discovery service 202, simple file transfer service 204 and remote execution service 206. In another embodiment of the present invention, network management service 200 may also include communication service 208 depicted in FIG. 2 with dashed lines. Each of the respective elements of network management service 200, and their corresponding communication protocols will be described more fully below. However, before describing these elements in further detail it should be noted that network management service 200 is an enabling technology. That is to say, network management service 200 enables a client to discover remote agents, communicate with remote agents, transfer files to and from remote computers, and remotely initiate local execution of applications on the client, independent of the particular type of operating system (s) operating on the client computer. Invocation of the services offered by the network management service may be accomplished in any number of approaches known in the art, e.g., application program interface(s) (API's).

Returning to the description of the elements of FIG. 2, network management service 200 includes agent discovery service 202. Agent discovery service 202 is the subject of the parent US Patent Application, identified above. In brief, agent discovery service 202 enables network management service 200 to discover and register remote agents, and allows local agents to be discovered and remotely registered. The remote agents may be agents residing on remote clients or remote servers. In one embodiment of the present invention, agent discovery service 202 initiates the discovery process by broadcasting a packet (or datagram) of information on network 100 via network medium 120. In the context of this implementation, the packet of information is referred to as a PING packet, i.e., the packet of information sent by agent discovery service 202 searching for remote agents. On behalf of remote agents disposed to discovery, discovery service of like kind, which may or may not be part of a network management agent, responds to the received PING packet with a similar packet of information, i.e., a PONG packet via network 100.

In one embodiment of the present invention, lists of remote agents discovered are maintained. In one embodiment, for example, local applications instruct network management service 200 to discover remote agents, while in an alternate embodiment, network management service 200 autonomously updates the discovered list. In addition, agent discovery service 202 of network management service 200 responds, in accordance with user preferences for the network element in which it resides, to PING packets of remote agents.

Another element of the network management service 200 of FIG. 2 is the simple file transfer service 204. In one implementation, files may be "pushed" (e.g., from client 102 to server 106) or "pulled" (e.g., from server 106 to client 102) using a pair of simple file transfer service 204 disposed in a client and a server, respectively. In an alternate implementation, simple file transfer service 204 unilaterally identifies and retrieves a file from a remote agent. In one embodiment, a listing (e.g., a directory) of the files available on the remote agent may be obtained by simple file transfer service 204, in addition to the files themselves. In one embodiment, simple file transfer service 204 will depict a directory of available files in a UNICODE format, requiring local agents to interpret the UNICODE listing and translate the UNICODE directory into a local format. In one embodiment of the present invention, communication for the simple file transfer service 204 is performed on dynamic IPX sockets and UDP/IP ports, while in alternate embodiments, a fixed socket/port may be assigned.

The communication protocol employed by simple file transfer service 204 uses a request/reply datagram sequence to accomplish the file transfer. For example, in one implementation, simple file transfer service 204 requests include cancel, close, execute, list, create, read, shutdown and write operations. In accordance with this example protocol, each request will be responded to with a reply. For example, a create request will be responded to with a create reply.

In accordance with this example protocol, a create request is used to obtain a file handle for a new file to be created on the server. A cancel request is used to abort or cancel any operation in process. In one embodiment, the cancel request does not elicit a reply. The close request is used to prematurely close a write request. The list operation is used to obtain a directory listing of files. The directory listing may contain a single file name or it may contain an iterative list of file names satisfying wild-card characters. In one embodiment, the read request/reply datagrams contain a status field which indicates to the simple file transfer service when the end of file (EOF) is reached. Similarly, the write request is used to "push" a file from the client to the server. In one embodiment, the write request/reply datagrams contain a status field which indicates to the simple file transfer service that the end of file (EOF) has been reached.

The shutdown request is used to log off, power off, reboot, "kill" or shutdown a remote server. In particular, the shutdown request contains an attribute field which specifies which of the above operations are to be performed with the issuance of the shutdown request. In one embodiment, the server will reply with a failed shutdown request if there are other clients using it. However, by utilizing the "kill" option of the shutdown request, the client forces the server to terminate all clients (with ample notification to the clients that the server is going down) and proceeds with the request.

In accordance with the example protocol, the execute request is used to remotely initiate local execution of a specified process. In one embodiment of the present invention, the request/reply sequences take the form of a communication packet, or datagram. One example of a file transfer datagram is depicted in FIG. 3.

Figure 3:
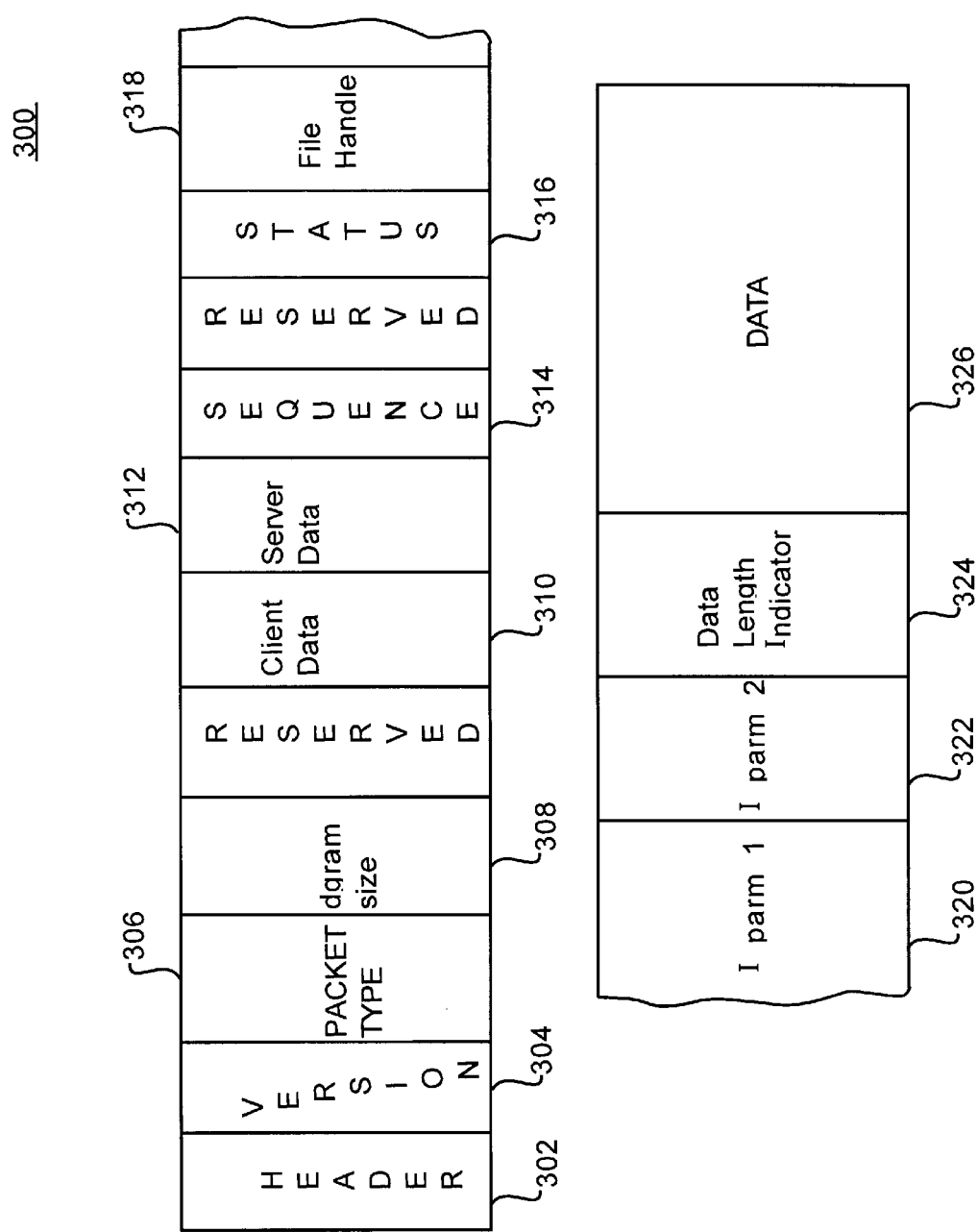
FIG. 3 is an illustration of a simple file transfer datagram used to communicate between network management services.

In accordance with the example file transfer datagram of FIG. 3, file transfer datagram 300 is depicted comprising header 302, version 304, packet type 306, dgram_size 308, client_data 310, server_data 312, sequence field 314, status 316, file handle 318, I_parm_1 320, I_parm_2 322, data length indicator 324 and data 326. In this example file transfer datagram 300, header 302 includes a header identifying the transport service utilized. In one embodiment, for example, header 302 is the base transport layer header. Version field 304 indicates the file transfer protocol version. That is, the version of the datagram is compared to the version of the application, wherein the datagram packet is converted to the appropriate version, if necessary.

The packet type field 306 of file transfer datagram 300 indicates the request or reply type for the current packet. For example, packet type 306 will indicate whether the current request is an open, close, cancel, etc. The dgram_size field 308 specifies the maximum packet size that can be accepted by the sender of the datagram (i.e., datagram 300). Consequently, any packet returned to the sender should not exceed this size. In addition, those skilled in the art will appreciate that each of the different transport layers support a different maximum datagram size, which should not be exceeded. Consequently, dgram_size 608 contains the smaller of either the maximum datagram size of the sender, or the maximum datagram size of the base level transport layer employed. Client_data field 310 indicates identification data from the client side. The server application places the contents of client_data field 310 of a request packet into the client_data field 310 for the corresponding reply packet. The data of the client_data field 310 may be used, for example, to identify some instance data associated with the current packet session. Similar to client_data field 310, is server_data field 312 which contains information with regard to the server. Sequence field 314 is used to identify repeated request and reply packets.

With continued reference to the file transfer datagram of FIG. 3, status field 316 indicates the success or failure of a request. In one embodiment, for example, a zero indicates success, while a non-zero value represents some sort of error. File handle 318 may be found in all replies and in all requests except for an open or a create request (wherein the reply will include the file handle). I_parm_1 320 and I_parm_2 322 are optional fields in the datagram and may, in one embodiment of the present invention, be used for creation data and file size in the open reply. Data length 324 indicates the byte-length of the data field. Data 326, if present contains dynamic length data.

The contents of data field 326 depend on the packet type. For example, for a create packet type, data field 326 may contain the file specification, whereas for a read packet type, data field 326 may contain the read data. In the example implementation, all file transfer requests and replies use the same packet format. Not all fields are used by all requests or replies. In one embodiment, for example, when a field is not used in a particular request or reply, it is set to zero.

Figure 4:
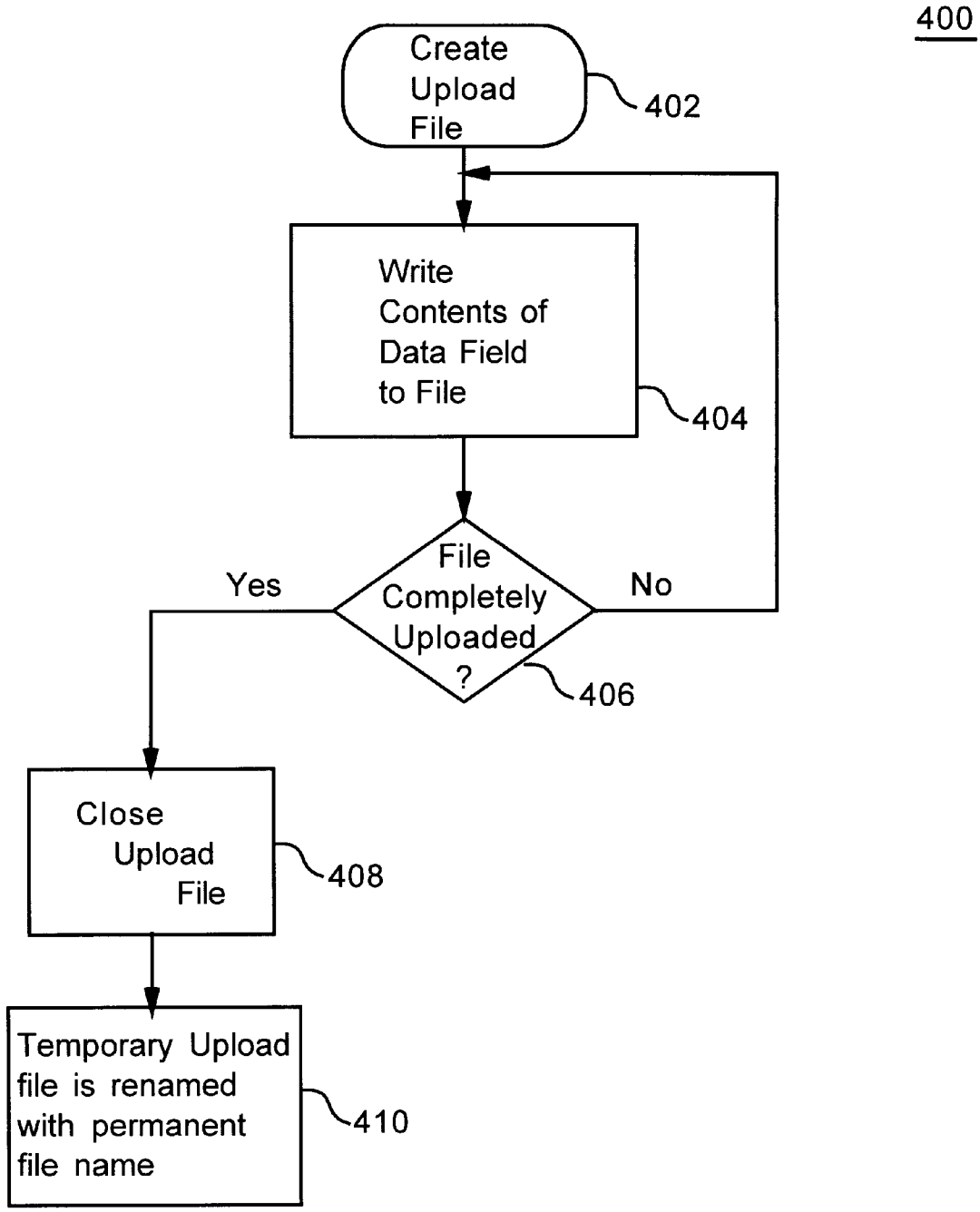
FIG. 4 is a flow chart depicting the method steps for pushing a file from a client to a server utilizing the network management service of FIG. 2.

In accordance with this example implementation, FIG. 4 depicts a series of method steps wherein a file is pushed from a client to a server (e.g., client 102, server 106) through network management services. As depicted in FIG. 4, the process begins with a create request sent by client 102 to server 106 using file transfer service of the respective network management service or equivalent, step 402, wherein a temporary file is created on server 106 to store the pushed data. In one embodiment of the present invention, when the temporary upload file is created, a corresponding temporary file handle is created by simple file transfer service 204 of the server by which the temporary upload file is subsequently referred. Those skilled in the art will recognize that "a file handle is a [unique] 'token' (number) that the system uses in referring to an open file" (*Computer Dictionary, Second Edition*, published by Microsoft Press, page 165 (©1994)). That is to say, the file handle binds the upload file to a particular network address, wherein the network address includes the client application's dynamic socket/port. It should be appreciated, then, that there may be only one file handle per network address active at one particular time (unless multiple network transport services-sockets/ports are available, i.e., a multiprocessing multi-communication channel system).

In one embodiment, the temporary upload file is created by simple file transfer service 204 of network management service 200 of the server in a non-volatile storage device on the server. In an alternate embodiment, simple file transfer service 204 of network management service 200 of the server may allocate space in a volatile storage device for the temporary upload file.

Once the temporary upload file has been created, i.e., on the server (e.g., server 106), the client opens the file which is to be uploaded and a write file transfer datagram is issued in step 404, wherein data is written from the file resident on client 102 to the temporary upload file created on server 106. The amount of data pushed with each write file transfer datagram is dependent upon the size of data field 326 of datagram 300. In step 406, a determination is made at client as to whether the end of the file to be pushed has been reached. If so, a close file transfer datagram is issued and the temporary upload file on the server is closed, step 408. If it is determined in step 406 that the end of the file to be pushed has not yet been reached, however, the process loops back to step 404, wherein another write file transfer datagram is issued and the next block of data is written from client 102 to the temporary upload file on server 106. The looping process (e.g., steps 404 and 406) continues until all of the data to be pushed has been written to the temporary upload file on server 106, whereafter a close file transfer datagram is issued and the temporary upload file is closed, step 408. Once the temporary upload file is closed, step 408, server 106 renames the temporary upload file with the filename designated in the create request and any other file with the same name is removed, step 410. If, however, a cancel request is issued prior to a close request, any previous file with the same name is preserved.

Figure 5:
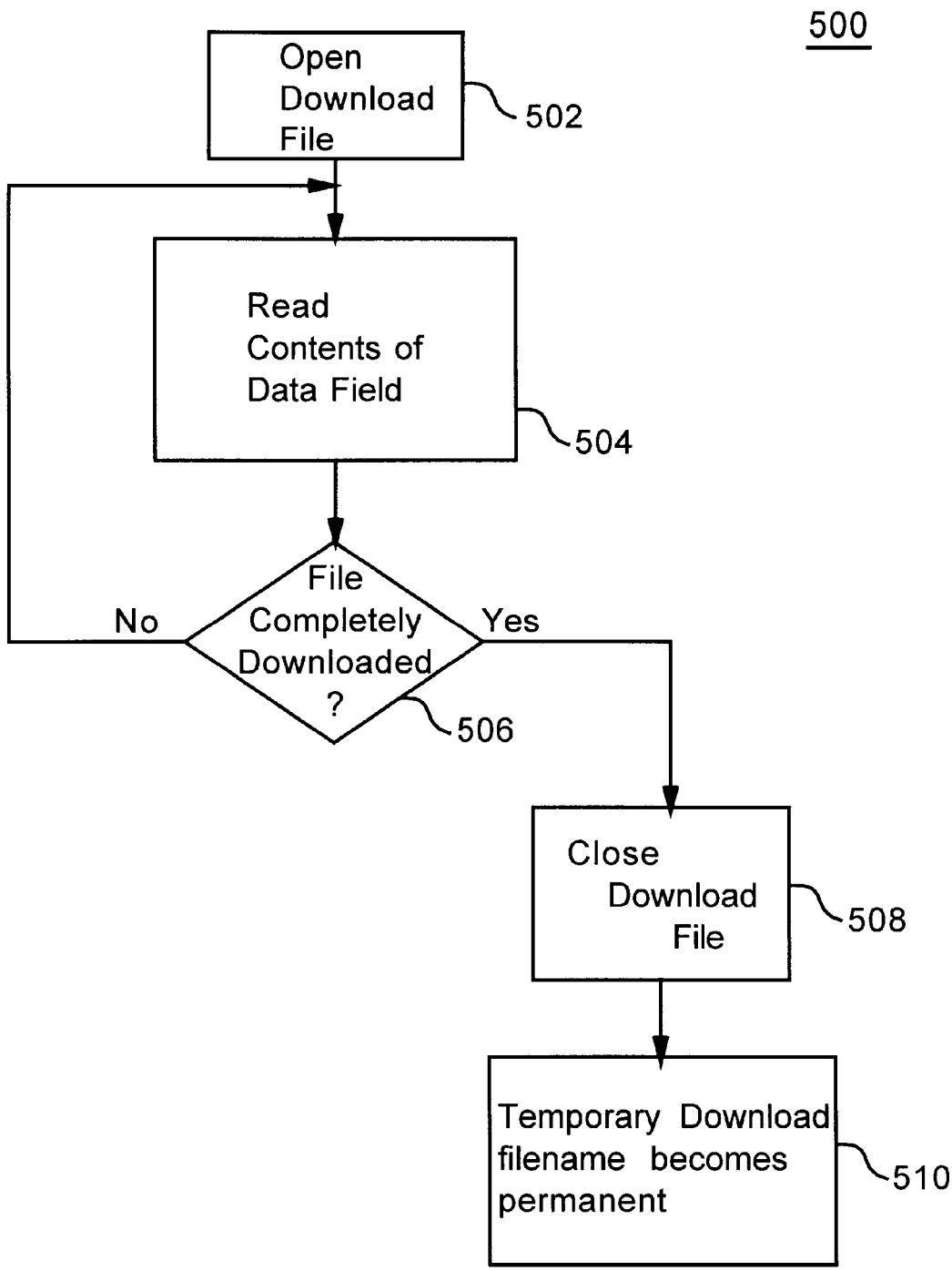
FIG. 5 is a flow chart depicting the method steps for pulling a file from a server to a client utilizing the network management service of FIG. 2.

Similarly, in accordance with this example implementation, files may be pulled from a server to a client (e.g., from server 108 to client 104) employing simple file transfer service 204 of network management service 200 or equivalent, as depicted in FIG. 5. As illustrated, FIG. 5 depicts the method steps by which the simple file transfer service 204 of network management service 200 of a client "pulls" a file from server 108 to client 104. The method begins wherein simple file transfer service 204 of the client issues an open file transfer datagram, step 502, and in response simple file transfer service 204 of the server opens the source file located on the server (e.g., server 108). Concurrently, client 104 creates a temporary download file into which the data from the remote file will be read. Similar to the push process, client 104 creates a temporary download file, referenced via a file handle.

Once the remote file is opened, step 502, a read file transfer datagram is issued, wherein a block of data is read from the remote file into the temporary download file, step 504. The amount of data pulled in a single read file transfer datagram is limited only by the size allocated to data field 326 of file transfer datagram 300. Subsequently, in step 506, simple file transfer service 204 of the client determines whether the end of the remote file has been reached. If not, the method loops back to step 504, and the next block of data is pulled. If, however, the entire file has been pulled, simple file transfer service 204 of the client issues a close file transfer datagram to close the remote file, step 508. Once the close request has been issued, the file handle of the temporary download file is made permanent. If, however, a cancel request is issued prior to a close request, the remote file is closed and the temporary download file is removed (i.e., enabling client to reallocate memory allocated to the temporary download file).

In addition to its agent discovery service 202 and file transfer service 204 elements, network management service 200 of FIG. 2 includes remote execution service 206. Remote execution service 206 of network management service 200 is used to initiate remote execution of an application, as well as remotely initiate local execution of an application. In one embodiment remote execution services 206 disposed on a client and a server cooperate to facilitate a server to respond to a client (or vice versa, or among clients, or among servers) to initiate execution of a file. In one implementation, a communication protocol of datagrams is employed by remote execution service 206 to facilitate remote initiation of local execution of an application, or initiate remote execution of an application. One example of a datagram employed by remote execution service 206 is illustrated in FIG. 6.

Figure 6:
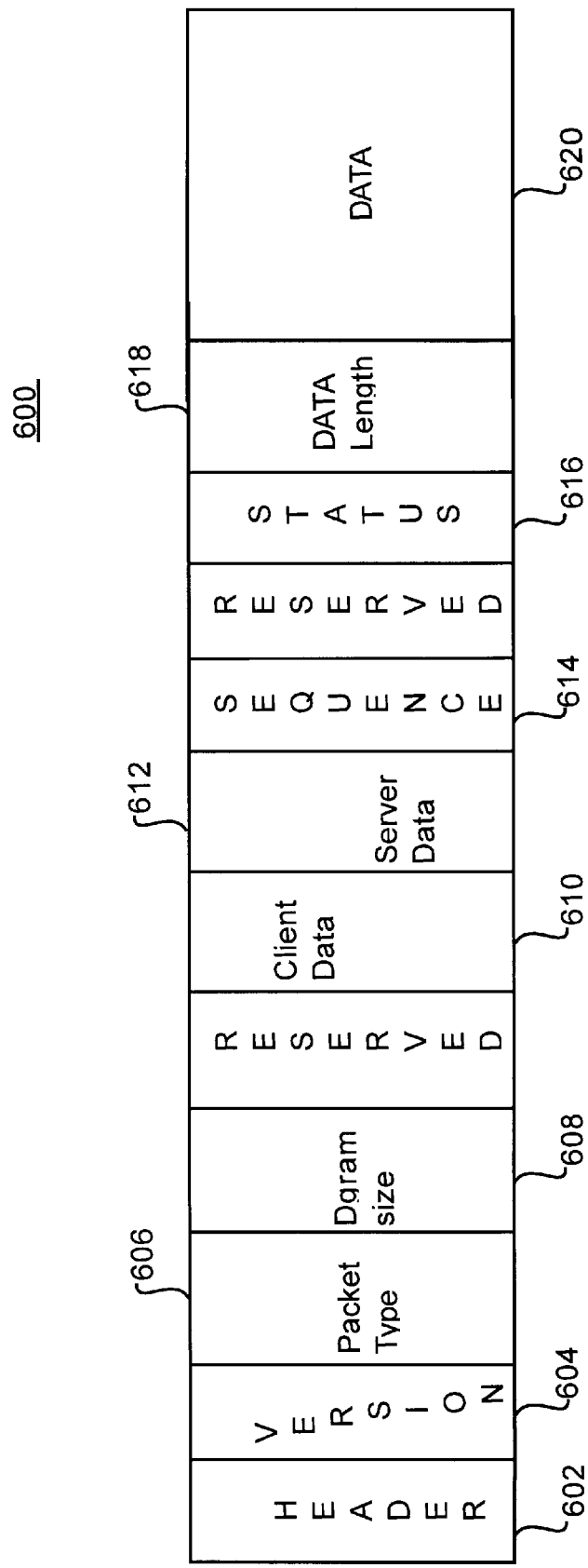
FIG. 6 is an illustration of a remote execution datagram used to communicate between network management services.

FIG. 6 illustrates an example of a datagram communication packet suitable for use by remote execution service 206. As depicted in FIG. 6, remote execution datagram 600 is shown comprising header 602, version 604, packet_type 606, dgram_size 608, client_data 610, server_data 612, sequence 614, status 616, data_length 618 and data field 620. Of particular interest is data field 620, wherein the executable filename and any command-line arguments (i.e., an argument list) are contained. In one embodiment of the present invention, each of the arguments within data_field 620 are zero-terminated, and the argument list ends after an empty string (also zero-terminated). Thus, in accordance with this example implementation, an example of the information contained in data_field 620 is depicted in example (1) below.

PBRUSH.EXE\0BITMAP.BMP\0\0     (1)

In an alternate embodiment, the data contained within data_field 620 may be terminated with a carriage-return/line-feed, terminated by a null-string (0), as depicted below in example (2).

PBRUSH.EXE

BITMAP.BMP 0     (2)

The remote execution service 206, in the role of facilitator, upon receipt of remote execution datagram 600 checks for the presence of the executable file described in data_field 620 and, if present, causes the file to be executed. Authorization services are incorporated into and are the responsibility of remote execution service 206. The authorization protocol will vary depending on the operating environment. In one embodiment, the execution of the applications will not begin until the network management service 200 has been shutdown. In another embodiment, network management service 200 may cause itself to be transferred to and executed on a remote computer.

Continuing with the description of remote execution datagram 600, header field 602 contains information related to the type of transport employed. In one embodiment, for example, header field 602 contains the transport layer header. Version field 604 contains the file transfer protocol version. The packet_type field 606 of remote execution datagram 600 contains the request or reply type for this packet. The dgram_size field 608 contains information as to the maximum packet size that can be accepted by the sender of remote execution datagram 600. Consequently, any packet returned to the sender of remote execution datagram 600 (i.e., a reply) should not exceed this size. As was the case for file transfer datagram 300, dgram_size 608 contains the smaller of either the maximum datagram size of the sender, or the maximum datagram size of the base level transport layer employed.

In addition, remote execution datagram 600 includes client_data field 610. In one embodiment, for example, client_data field 610 is a four-byte field containing data from the client side. The remote execution service places the contents of client_data field 610 of a request packet into the client_data field 610 for the corresponding reply packet. The data of the client_data field 610 may be used, for example, to identify some instance data associated with the current packet session. Similar to client_data field 610, is server_data field 612 which contains information with regard to the server. Sequence field 614 is used to identify repeated request and reply packets. Status field 616 of remote execution datagram 600 indicates the success or failure of a request. The data_length field 618 indicates to the recipient of remote execution datagram 600 the length of the data field.

In addition to the above described elements of network management service 200, i.e., agent discovery service 202, simple file transfer service 204 and remote execution service 206, network management service 200 may beneficially include communication service 208. Network management service 190 employs communication service 208 to "translate" the information to/from the transport layer service.

In one embodiment, communication service 208 allows network management service 200 to function regardless of the underlying network transport protocol by abstracting the differences of the supported transport protocols (TCP/IP, IPX/SPX, etc.) into a set of common-denominator functions, and by establishing well-known port or socket addresses for communication service communications. For example, in one embodiment, communication service 208 establishes "listening addresses" for all of the supported transport protocols (identified above) and uses the agent discovery service 202 discovery protocol to make these listening addresses available to other instances of communication service 208 located throughout the network. Having established listening addresses for each supported transport protocol, and having made those addresses discoverable to communication service 208 of remote network management services (i.e., network management service 200), the network management service 200 of the server may then proceed to perform communications over the network, via communication service 208 without regard to any particular transport protocol supported by a particular client. In particular, communication service 208 on a server (e.g., server 108) knows which protocol(s) is(are) supported by communication service 208 on the client (e.g., client 104), and at which listening addresses those protocols are typically received.

Given the descriptions and example implementations above, one skilled in the art will appreciate that the innovative features of network management service 200 may be implemented in a number of alternate embodiments. In one embodiment, for example, network management service 200 may take the form of a plurality of software instructions stored in a machine readable format and executed by a computer. In an alternate embodiment, network management service 200 may be embedded in an Application Specific Integrated Circuit within a computer.

Figure 7:
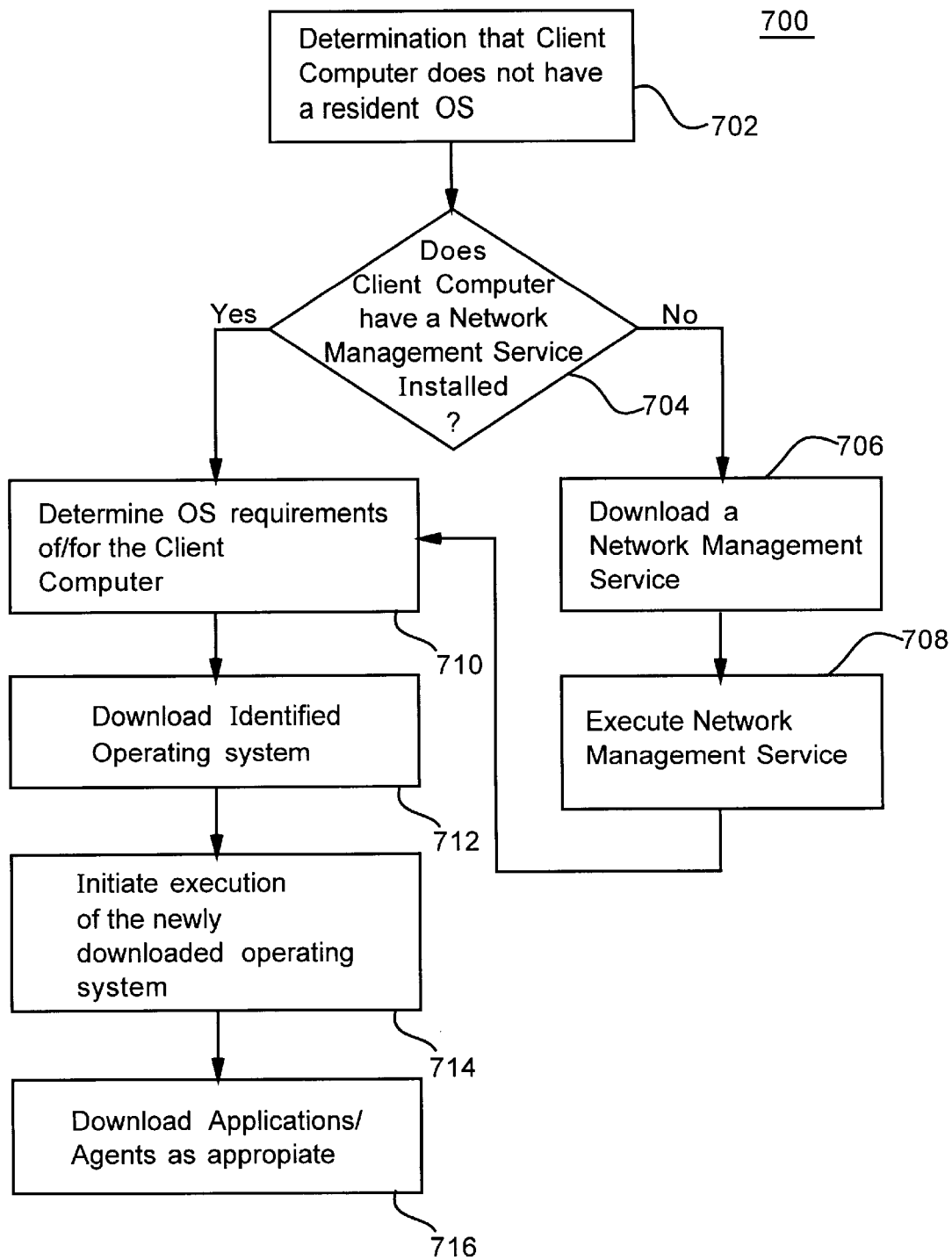
FIG. 7 is a flow chart depicting the method steps of one example of remotely configuring an unconfigured client utilizing a network management service, in accordance with the teachings of the present invention.
Figure 8:
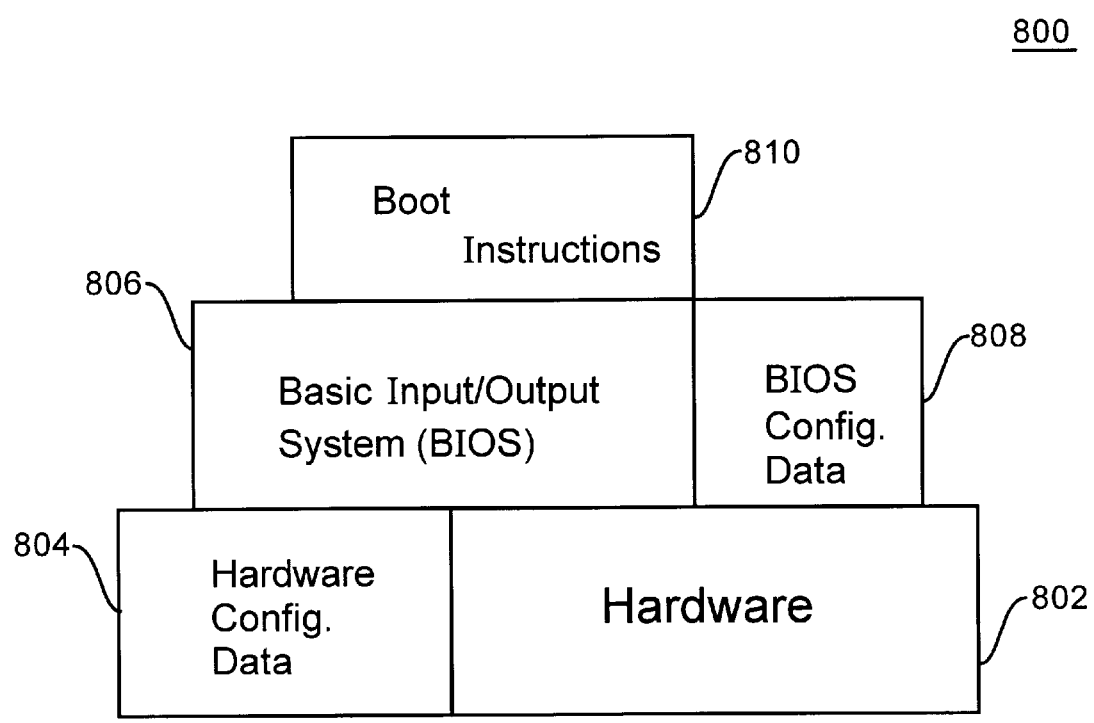
FIG. 8 is a block diagram illustrating an example of an unconfigured client computer.
Figure 9:
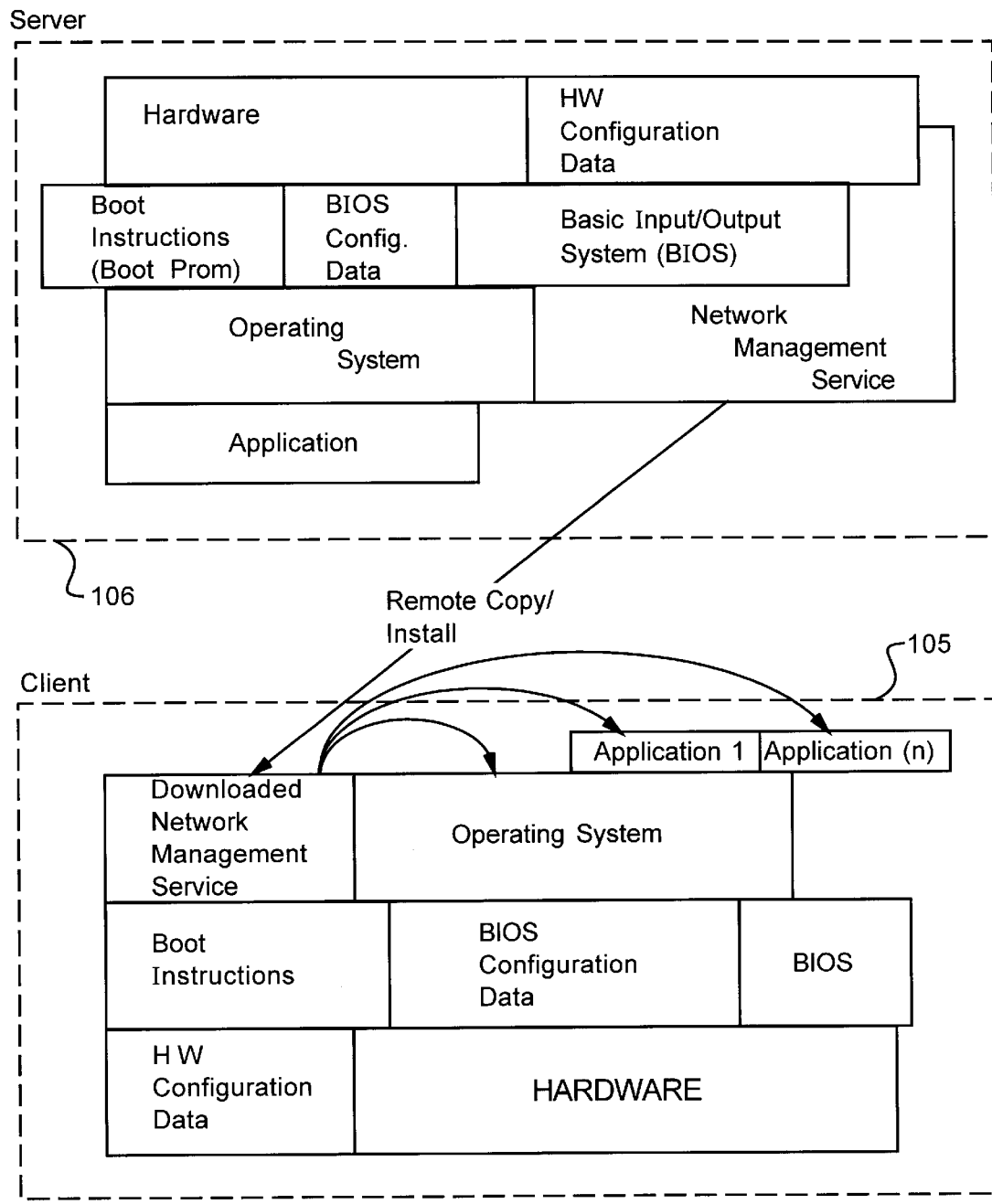
FIG. 9 is a block diagram depicting the method steps of FIG. 7 from a high-level network architecture view.

Having described the functional elements and protocols employed by network management service 200 in FIGS. 2–6 above, FIGS. 7–9 are provided as an example, and not limitation, of an example application of the innovative features of the network management service 200. In FIG. 7, a flow chart illustrating one example of a method for configuring an unconfigured client computer. For ease of understanding, the example application of FIGS. 7–9 will be described in the context of the elements of network 100. Accordingly, in the context of the example implementation, a network management application (e.g., application 160) executing on a server (e.g., server 108) through network management service 200 detects an unconfigured client computer (e.g., client 105) and, in accordance with the innovative features enabled by the network management service (e.g., network management service 192), configures the client for operation within network 100.

Before describing the method of FIG. 7 in detail, it may be helpful to review an example high-level architecture of an unconfigured client. FIG. 8 illustrates a block diagram of the high-level architecture of unconfigured client computer 800. The use of the term "unconfigured" may be a bit of a misnomer insofar as there is a rudimentary level of functionality that is assumed when a computer is shipped from a computer manufacturer. As depicted in the example architecture of FIG. 8, "unconfigured" client computer 800 includes hardware 802, hardware configuration data 804, basic input/output system (BIOS) 806, BIOS configuration data 808 and a rudimentary set of network boot instructions stored in non-volatile memory (e.g., a boot PROM) 810. In one embodiment, client computer 800 is client 105. Hardware 802 includes at least one processor, a memory subsystem, an input/output device, and a communications subsystem. In one embodiment, hardware 802 may also include such items as a mass storage device, a display, peripherals, and the like. Hardware configuration data 804 includes information necessary to interface elements of hardware 802. BIOS 806 provides basic input/output services. In one embodiment, BIOS 806 includes desktop management interface (DMI) services including special network manageability services, e.g., in accordance with *Desktop Management BIOS Specification*, version 2.0, dated Feb. 23, 1996. BIOS configuration data 808 includes configuration data for the hardware/I/O system. Boot instructions 810 provide a set of instructions executed at start-up which provide a nominal level of functionality to the computer. Boot instructions 810 are stored in a non-volatile memory such as a programmable read-only memory (PROM), and initiate execution of a rudimentary "operating system" (OS).

In one embodiment, the rudimentary "OS" provides the computer with a rudimentary level of memory management, communication and file transfer capability to computer 800.

Returning to the example method of FIG. 7, the method of configuring an unconfigured client begins with step 702, wherein server 108 determines that client 105 is not executing an operating system. The means by which server 108 determines that client 105 does not have an operating system depends upon the configuration of client 105. For example, in one embodiment wherein client 105 is configured with network management service 200, the agent discovery service broadcasts PING datagrams looking for servers that can fully configure client 105. In an alternate embodiment, a network management service resident on server 108 broadcasts PING datagrams searching for unconfigured network clients, and client 105 responds to the PING datagram with an indication identifying client 105 as an unconfigured network client.

For the illustrated example, once it has been determined by management application 160 that client 105 is not populated with an operating system, management application 160 next determines whether client 105 is populated with a network management service. As described above, in one embodiment, agent discovery service 202 of network management service 192 issues a PING datagram on network medium 120 via network transport service 180, and awaits a reply (i.e., a PONG datagram). If, in step 704, it is determined that client 105 does not have a network management service, network management service 192 downloads a copy of network management service to client 105 via the rudimentary OS, in accordance with, for example, the method steps illustrated in FIG. 5, step 708. Once the download of a network management service has been completed in step 708, its execution is initiated, step 710.

Once a network management service has been downloaded to and executed on client 105 from network management service 192 in steps 706 and 708, or if in step 704 it was determined that client 105 was already enabled with a network management service, management application 160 determines the operating system requirements for client 105, step 710. In one embodiment, for example, this determination is made by ascertaining the type of processor resident in client 105. Having determined the operating system requirements of client 105, management application 160, via simple file transfer service 204 of network management service 192 downloads an appropriate operating system from server 106 to client 105, step 712. Once the download of the appropriate operating system has been completed in step 712, remote execution service 206 of network management service 192 of server 106 and the remote execution service of the newly downloaded network management service on client 105 are employed by management application 160 to remotely initiate execution of the newly downloaded operating system on the client, step 714. In one embodiment, for example, the remote execution service of network management service 192 of server 106 issues a remote execution datagram to the remote execution service of the downloaded network management service resident on client 105, identifying the AUTOEXEC.BAT file, with appropriate command line entries, thereby remotely initiating local execution of the operating system on client 105.

In addition to the download of a new, or an upgrade of an existing operating system, server 106 may utilize network management service 192 and the newly downloaded network management service on client 105 to download additional applications or agents to client 105, step 716. FIG. 9 illustrates a block diagram of the method steps depicted in FIG. 7 from a network perspective. In particular, FIG. 9 illustrates server 106 downloading a network management service to client 105 and subsequently utilizing the downloaded network management service to facilitate a network management agent to configure client 105 with an operating system and other applications/agents.

Figure 10:
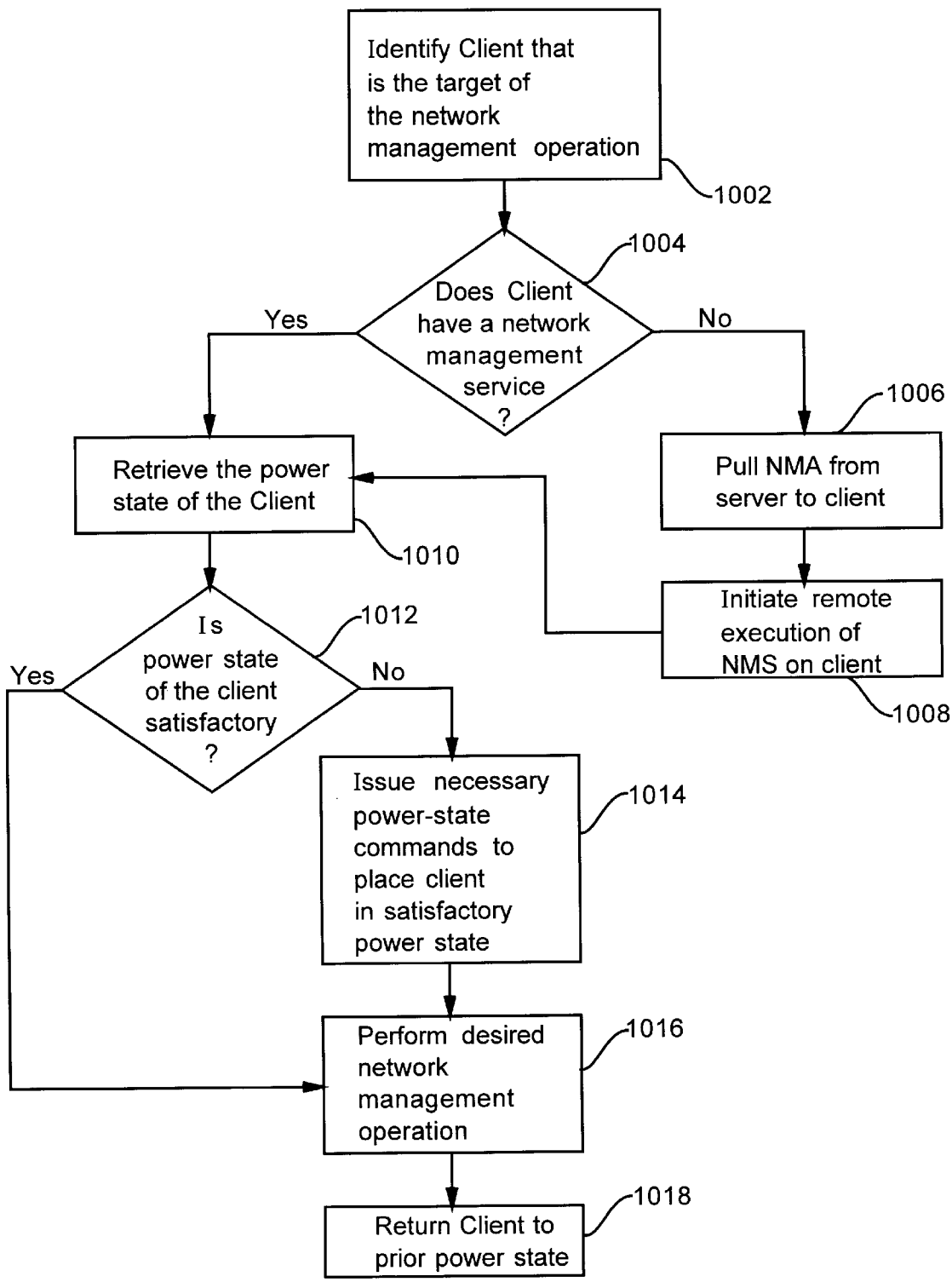
FIG. 10 is a flow chart illustrating the method steps for enabling remote power management using the network management service of FIG. 2, in accordance with the teachings of the present invention.

Another example of the innovative features enabled by the introduction of network management service 200 into a network is illustrated in FIG. 10. In particular, FIG. 10 illustrates the method steps wherein a server configured with network management service 200 facilitates remote initiation (i.e., "power up") of a network management service-enabled client computer that is in a power-off or "sleep" state (e.g., a low power state) to perform network management operations, and subsequently returns the client to its power state prior to the network management session. For ease of explanation, the method steps of FIG. 10 will be developed in the context of the network elements of FIG. 1.

The method begins, step 1002, with a network management agent identifying a client (e.g., client 102) that is the target of the management operation (i.e., the remote power-up operation) of the server (e.g., server 108). There are a number of methods by which the target client may be identified. In one embodiment, for example, network management agent 162 establishes a list of all network clients which are operating under a prior version of a particular operating system, which includes client 102 for this example. In accordance with the teachings of the present invention, rather than interrupting the computer services to a user of client 102 by immediately upgrading the clients operating system, network management agent 162 may make a log entry of the fact that the identified client needs defined network maintenance. Subsequently, when network management agent 162 "senses" that client 102 has been powered-off, network management agent 162 waits for a convenient maintenance period to perform such maintenance (e.g., after normal working hours).

Having identified the target client in step 1002, network management service 192 of the server is called upon to determine if client 102 is configured with a network management service. In one embodiment, network management service 192 sends a PING datagram to discover if client 102 is configured with a network management service, in accordance with the teachings above. If network management service 192 determines that client 102 is not populated with a network management service, network management service 192 populates client 102 with a network management service. In particular, with client powered-up, network management service 192 of the server pushes (i.e., downloads) a network management service from server 108 to client 102, step 1006, and remotely initiates local execution of the pushed network management service, step 1008, in accordance with the teachings of FIG. 5.

If, in step 1004, it is determined that client 102 is populated with a network management service (e.g., network management service 150), network management agent 162, through network management service 150, retrieves the last power state of client 102. In step 1010, network management agent 162 determines if the power state of client 102 is satisfactory to perform the desired operation, step 1012. If not, network management agent 162 issues a power state command through network management service 192 to network management service 150 to place client 102 in the necessary power state, step 1014.

Having issued the power state command in step 1014, or if in step 1012 it is determined that client 102 is in the proper power state to perform the desired operation, network management agent 162 performs the desired management function in step 1016. In accordance with the present example implementation, network management service determines that client is in a powered-down state, steps 1010, 1012, and issues the necessary power state command to enable at least a subset of the system components comprising client 102 (e.g., the computer, but not the monitor, printer, scanner, etc.), step 1014. Once client 102 has booted up, albeit running an old version of the OS, network management service initiates an OS upgrade, step 1016.

Having completed the desired network management operation in step 1016, network management agent 162 issues a power state command to network management service 150 through network management service 192 to place client 102 in the power state prior to the network management session, step 1018.

Those skilled in the art will appreciate that the innovative network management service provides a heightened level of network manageability and interoperability. As described above, the network management service is platform independent; that is, it will work in a myriad of computer processing environments. Insofar as the network management service 200 operates independently of any particular computer operating system, the introduction of a network management service 200 into a network (e.g., network 100) allows a network manager in a central location to not only monitor network statistics, but to interrogate and remotely manipulate remote clients. As alluded to earlier, network management service 200 is an enabling technology providing a new generation of network management applications with interoperable access to the most fundamental processes of the computer system.

Thus, alternative embodiments for a method and apparatus facilitating the management of networked devices have been disclosed. While the method and apparatus of the present invention has been described in terms of the above illustrated embodiments, those skilled in the art will recognize that the invention is not limited to the embodiments described. For example, one skilled in the art will appreciate from the above description and example implementations that network management service 200 may be beneficially employed to perform a number of network functions heretofore unavailable in prior art network management tools. In addition, it has been shown that it is unnecessary for each of the computing elements within network 100 to incorporate network management service 200, for so long as it is available within the network, it may be downloaded and executed on an as needed basis. Thus, those skilled in the art will appreciate that the present invention can be practiced with modification and alteration within the spirit and scope of the appended claims. Accordingly, the descriptions thereof are to be regarded as illustrative instead of restrictive on the present invention.

What is claimed is:

1. A network management service comprising:
   an agent discovery service, including a discovery function to broadcast agent discovery messages to discover remote agents, if any, and a registration function to register discovered remote agents; and
   a file transfer service, to send information to and receive information from remote systems.

2. The network management service of claim 1, wherein the file transfer service uses a protocol to transfer files between network devices, independent of any particular operating system residing on the network devices.

3. The network management service of claim 1, wherein the information is an executable application.

4. The network management service of claim 1, wherein the information is the network management service itself.

5. The network management service of claim 1, wherein the information is an operating system.

6. The network management service of claim 1, further comprising a remote execution service to initiate execution of applications on discovered agents, and through which remote agents can initiate execution of local applications.

7. The network management service of claim 6, wherein the remote execution service uses a protocol to remotely initiate execution of files on network devices, independent of any particular operating system implemented on the network devices.

8. The network management service of claim 1, further comprising a communication service to translate between different network transport services.

9. A network management service comprising:
   an agent discovery service, including a discovery function to broadcast agent discovery messages to discover remote agents, and a registration function to register discovered remote agents; and
   a remote execution service through which the network management service can initiate execution of an application on discovered agents, and through which remote agents can initiate execution of local applications.

10. The network management service of claim 9, wherein the remote execution service uses a protocol to remotely initiate execution of files on network devices, independent of any particular operating system implemented on the network devices.

11. The network management agent of claim 9, further comprising a file transfer service, to send information to and receive information from remote systems.

12. The network management service of claim 11, wherein the information is an executable application.

13. The network management service of claim 11, wherein the information is the network management service.

14. The network management service of claim 11, wherein the information is an operating system.

15. The network management service of claim 11, further comprising a communication service to translate between different network transport services.

16. A network management service comprising:
   a file transfer service, to send information to and receive information from remote systems; and
   a remote execution service through which execution of discovered agents can be initiated, and through which remote agents can initiate local execution of applications.

17. The network management service of claim 16, wherein the file transfer service uses a protocol to transfer files between network devices, independent of any particular operating system residing on the network devices.

18. The network management service of claim 16, wherein the information is an executable application.

19. The network management service of claim 16, wherein the information is the network management service.

20. The network management service of claim 16, wherein the information is an operating system.

21. The network management service of claim 16, wherein the remote execution service uses a protocol to remotely initiate execution of files on network devices, independent of any particular operating system implemented on the network devices.

22. The network management service of claim 16, further comprising a communication service to translate between different network transport services.

23. A computer system including an operating system, the computer system further comprising:
   an agent discovery service, including a discovery function to broadcast agent discovery messages to remote agents, and a registration function to register discovered remote agents; and
   a file transfer service, to send information to and receive information from remote systems.

24. The computer system of claim 23, wherein the file transfer service uses a protocol to transfer information to and from remote computers independent of any particular operating system residing on the remote computers.

25. The computer system of claim 23, further comprising a remote execution service through which execution of discovered agents can be initiated, and through which remote agents can initiate local execution of applications.

26. The computer system of claim 25, wherein the remote execution service uses a protocol to remotely initiate execution of applications on remote computers, independent of any particular operating system residing on the remote computers.

27. The computer system of claim 23, further comprising a communication service to translate between different network transport services.

28. A computer comprising:
   a storage medium having stored therein a plurality of programming instructions which, when executed, implement a network management service including an agent discovery service to discover remote agents within a network of computer systems and to register discovered remote agents, and a simple file transfer service to transfer information to and receive information from remote systems; and
   an execution unit, coupled to the storage medium, to executing the programming instructions.

29. The computer of claim 28, wherein the network management service further includes a communication service to translate between different network transport services.

30. A computer configured to enable advanced network management functions within a computer network, the computer comprising:
   a storage medium having stored therein a plurality of programming instructions to implement a network management service including a simple file transfer service to transfer information to and receive information from remote systems, and a remote execution service through which execution of discovered agents can be initiated and through which remote agents can initiate local execution of applications; and
   an execution unit, coupled to the storage medium, to execute the programming instructions.

31. The computer of claim 30, wherein the network management service further includes a communication service to translate between different network transport services.

32. A method for implementing advanced network management functions in a computer network, the method comprising:
   (a) discovering remote agents operative on the network, independent of any particular operating system residing on network devices;
   (b) enabling a file transfer service for transferring files between network devices, independent of any particular operating system residing on the network devices; and (c) providing a remote execution service for initiating execution of an application on remote network devices, independent of any particular operating system residing on the remote network devices.

33. The method of claim 32, further comprising:

(d) utilizing a network transport service to translate information to/from a network management protocol; and (e) providing a communication service for communicating with remote network devices unendowed with the advanced network management functions independent of any particular operating system residing on the network devices.

34. A computer system comprising:

a plurality of processors cooperatively implementing an operating system (OS)

a network input/output interface, through which the plurality of processors communicate with remote network devices through services provided by the OS; and a network management service, in communication with at least a subset of the plurality of processors, the network management service including an agent discovery unit, coupled to the network input/output interface of the computer system, to broadcast discovery packets to discover and register remote agents, a file transfer unit, coupled to the network input/output interface of the computer system, to send/receive files from remote network devices, independent of any particular operating system residing on the remote network devices, and a remote execution unit, coupled to the network input/output interface of the computer system, to initiate execution of applications on remote network devices, independent of any particular operating system residing on the remote network devices.

35. The computer system of claim 34, wherein the network management service further includes a communication service, in communication with the agent discovery unit, the file transfer unit, and the remote execution unit, to support communication with remote network devices regardless of the transport protocol utilized by the remote network devices.

36. A machine readable medium having stored therein a plurality of machine executable instructions which, when executed, implement an advanced network management service including an agent discovery service to discover remote agents within the network of computer systems and to register discovered remote agents, a simple file transfer service to transfer files to and receive files from remote computers, and a remote execution service, through which the server can initiate execution of applications on remote computers independent of any particular operating system residing on the remote agents.

* * * * *